J. E. MARSHALL.

Harrow.

No. 9,495. Reissued Dec. 7, 1880.

Witnesses.

J. C. Perkins

C. L. Schilling

Inventor.

John E. Marshall.

By Lucius C. West.

Atty.

N. PETERS, PHOTO-LITHOGRAPHER, WASHINGTON, D. C.

UNITED STATES PATENT OFFICE.

JOHN E. MARSHALL, OF KALAMAZOO, MICHIGAN.

HARROW.

SPECIFICATION forming part of Reissued Letters Patent No. 9,495, dated December 7, 1880.

Original No. 198,401, dated December 18, 1877. Application for reissue filed August 14, 1880.

*To all whom it may concern:*

Be it known that I, JOHN E. MARSHALL, of Kalamazoo, Michigan, have invented new and useful Improvements in Harrows, of which the following is a specification.

My invention relates to harrow-frames bearing curved teeth having their points projecting to the front.

It has for its object certain improvements in harrow-frames which will cause said teeth to automatically free themselves from obstructions, and to cut deep or shallow, at the will of the operator, by adjustment.

Another object is to cause the harrow to readily adapt itself to the inequalities of the ground.

A further object is to prevent the rear beams of a vibratory harrow-frame from turning upward and rearward, throwing the teeth out of the soil, except when engaging serious obstructions, after which they resume their proper positions.

Its construction consists in four or more parallel bars or tooth-beams located at right angles with the line of draft, which beams are connected by hinges, hereinafter described, which allow each beam to move independently with a vibratory or rolling motion.

The teeth which I combine with my vibratory beams are made to curve forward, with their points projecting to the front, causing them to cut deeply into the soil, and as the beams to which they are secured, by being connected by the hinges, have a constant vibratory or rocking motion, said teeth readily clear themselves from sods, and, by being allowed to swing upward and backward, easily free themselves from more serious obstructions.

Its construction further consists in a spring engaging the two rear bars of the frame, as hereinafter described, effecting my last object.

Figure 1:
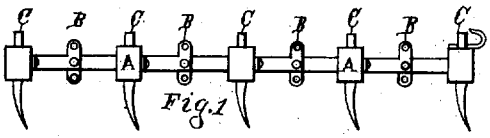
Figure 2:
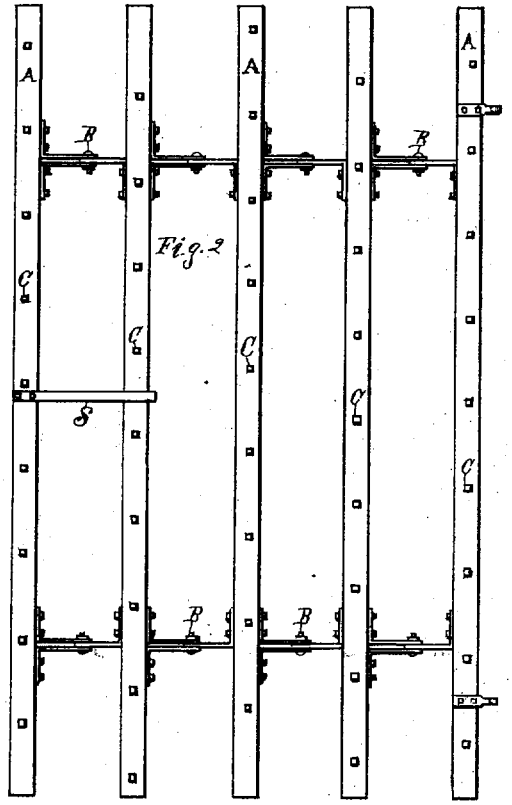
Figure 3:
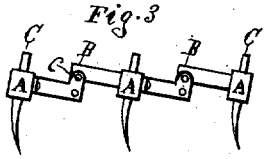
Figure 4:
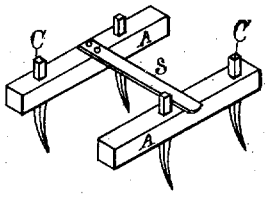
Figure 5:
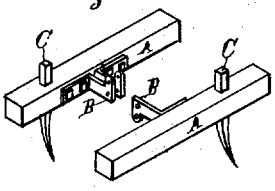

In the drawings, forming a part of this specification, Figure 1 is a cross-sectional view of Fig. 2, on a line near the hinges; Fig. 2, top view of harrow; Figs. 3 and 5, detached portions, showing the construction and operation of the hinges; and Fig. 4, detached portions of the two rear beams, to one of which the spring is secured, and which engages the other by resting upon it.

B is the hinge, consisting of two iron bars bolted to the beams A at a sufficient distance apart to receive between them a corresponding bar bolted to the beam A in front. The ends of these double bars are widened or made with a projection on the upper side, and the corresponding single bar has a similar projection extending downwardly, or they may be made ⊣-shaped. The ends of these bars are perforated, through which perforations a bolt is inserted, thus forming the hinge.

Two or more perforations are provided to admit of adjusting the angle of the teeth, so that they will cut deep or shallow. I accomplish the former result by inserting a bolt through an upper hole in the double bar and the lower hole in the single bar, which throws the base curved portions of the teeth at an oblique angle to the left of a perpendicular, causing them to readily and deeply enter the soil. The latter result is accomplished by reversing the order of adjusting.

In Fig. 3 the bars are in the position they would occupy were the bolt inserted through hole *c*, which gives a medium adjustment in the pitch of the teeth.

S is the spring, secured to the rear beam, A, and engaging the beam next in front with an easy friction.

The arrangement of the curved teeth C in relation to each other is such that each one cuts a track separate from every other when the frame is drawn forward at right angles with the line of draft.

What I claim, and desire to secure, is—

1. In a harrow, the bars A, provided with teeth, in combination with the adjustable hinge B, constructed with the ⊣-shaped perforated plates, substantially as described, and for the purpose specified.

2. In a harrow, the spring S, attached as described, in combination with the hinge B and tooth-bars A, substantially as described, for the purpose specified.

3. The curved teeth C, bars A, united by the adjustable hinge B, and the spring S, rigidly attached to the rearmost bar, A, all constructed and combined substantially as described.

4. The harrow-teeth C, curved and having their lower points projecting to the front, in combination with the tooth-beams A, united by adjustable hinge B, whereby said teeth are adjusted to cut deep or shallow, and automatically free themselves from obstructions, all substantially as described and shown.

JOHN E. MARSHALL.

Witnesses:
L. C. HILLS,
O. BURGESS.